United States Patent [19]
Stehlin et al.
[11] 3,716,727
[45] Feb. 13, 1973

[54] SWITCHED AMPLIFICATION SYSTEM HAVING RADIATION COMPENSATION CIRCUITRY

[75] Inventors: Robert A. Stehlin; Hilton W. Spence, Richardson, both of Tex.

[73] Assignee: Texas Instruments Incorporated, Dallas, Tex.

[22] Filed: Dec. 29, 1969

[21] Appl. No.: 888,393

[52] U.S. Cl. ..................307/243, 307/296, 307/308, 330/30 D

[51] Int. Cl. ..................H03k 17/00

[58] Field of Search........307/308, 243; 330/30 D, 69

[56] References Cited

UNITED STATES PATENTS

| | | | |
|---|---|---|---|
| 3,409,839 | 11/1968 | Crowe | 307/308 X |
| 3,170,125 | 2/1965 | Thompson | 330/30 D |
| 3,508,076 | 4/1970 | Winder | 330/30 D |
| 3,524,999 | 8/1970 | Fleitcher | 307/308 |

OTHER PUBLICATIONS

I.B.M. Tech Discl. Bull., Vol. 10 No. 4, Sept. 1967, Gain Change Amplifier, by Hollstein, Jr., pages 521 & 522.

*Primary Examiner*—Donald D. Forrer
*Assistant Examiner*—B. P. Davis
*Attorney*—James O. Dixon, Andrew M. Hassell, Harold Levine, Melvin Sharp, Henry T. Olsen, Michael A. Sileo, Jr. and John E. Vandigriff

[57] ABSTRACT

First and second radiation-compensated differential amplifiers are each connected to receive different low level input signals. The outputs of the differential amplifiers are fed into a third amplifier through buffer stages. Switching circuitry is provided to selectively actuate either of the first or second amplifiers to exclusively feed signals into the third amplifier.

16 Claims, 8 Drawing Figures

INVENTORS:
ROBERT A. STEHLIN
HILTON W. SPENCE

INVENTORS:
ROBERT A. STEHLIN
HILTON W. SPENCE

INVENTORS:
ROBERT A. STEHLIN
HILTON W. SPENCE

SWITCHED AMPLIFICATION SYSTEM HAVING RADIATION COMPENSATION CIRCUITRY

This invention relates to amplifiers, and more particularly to differential transistor amplifiers which are generally insensitive to the presence of radiation fields.

A number of applications exist wherein it is necessary to amplify selected portions of extremely low level signals. For example, plated wire memories have heretofore been developed wherein magnetic film is disposed on plated wires which are intersected with insulated wires interconnected to form word coils. Bits of information may be stored at each intersection of an insulated word coil with a plated wire, the binary value of the information bit being represented by the direction of its magnetic vector. Examples of such plated wire memories are manufactured and sold by the Librascope Group, a subsidiary of General Precision Equipment Corporation. The voltage outputs from such memories are relatively low, in the range of about 5–20 millivolts, and substantial noise problems have heretofore been present in the use of such memories. These problems are even more exaggerated in many applications where it is desired to determine whether or not the low level signals are positive or negative, and then to amplify selected portions of the signal up to three to four volts in magnitude.

With the use of plated wire memories, it is advantageous to reduce the number of sensing amplifiers required by utilizing two or more sensing inputs into an amplifier and then selecting a desired sensing input with digital select logic signals. Previously developed logic select circuits have often depended upon the absolute value of resistors or the like, which in practice vary widely from one device to another. Additionally, many previously developed logic select circuits have been relatively sensitive to varying power supplies, thus causing select inaccuracies. It is an object of the present invention to provide a logic select circuit which is dependent upon the ratio of element magnitudes which may be accurately fabricated by state of the art integrated circuit techniques. It is also an object of the invention to provide a logic select circuit which is generally insensitive to variations in the voltage supply.

It is a well known phenomena that reverse biased semiconductor junctions generate additional leakage current when bombarded by gamma radiation. The radiation dislodges hole-electron pairs which act like current flow. This problem is particularly troublesome with semiconductor transistors wherein the presence of gamma radiation causes sufficient additional current flow that the transistors appear to have constant current sources disposed across their collector-base junctions. In amplifier circuits which are exposed to radiation fields, transistors may thus be saturated beyond the point wherein they act as amplifiers. It is an object of the present invention to provide amplification circuitry which is generally insensitive to relatively high magnitudes of gamma radiation.

In accordance with the present invention, a pair of differential amplifiers are each connected to receive different low level input signals. A third differential amplifier has inputs connected to receive the outputs of each of the pair of amplifiers. Electronic switching devices are coupled between the pair of amplifiers and the power source. The switching devices are operated in accordance with logic input signals such that either of the pair of amplifiers may be actuated to exclusively feed signals into the third amplifier.

In accordance with another aspect of the invention, an amplifier system includes plural stages which may be selectively connected into the system. A first electronic switching device having Zener breakdown characteristics is connected to a source of bias voltage through resistance, with one terminal of the switching device being connected to normally switch both of the stages out of the amplifier system. A second electronic switching device also with Zener voltage breakdown characteristics is connected through a resistance to the source of bias voltage. One terminal of the second switching device is connected for selectively switching one of the stages into or out of the amplifier system. Unidirectional conducting circuitry is connected to the other terminal of the second switching device to receive input logic signals which selectively control the state of the second switching device.

In accordance with yet another aspect of the invention, a multiple input amplification system includes a plurality of amplifying transistors each receiving an input signal at the base thereof. An emitter follower transistor is commonly connected to the output electrodes of each of the amplifying transistors. The emitter follower transistor generates sufficient current flow in response to a radiation field to compensate each of the amplifying transistors for the effects of the radiation field.

For a more complete understanding of the present invention and for further objects and advantages thereof, reference may now be made to the following description taken in conjunction with the accompanying drawings, in which.

Figure 1:
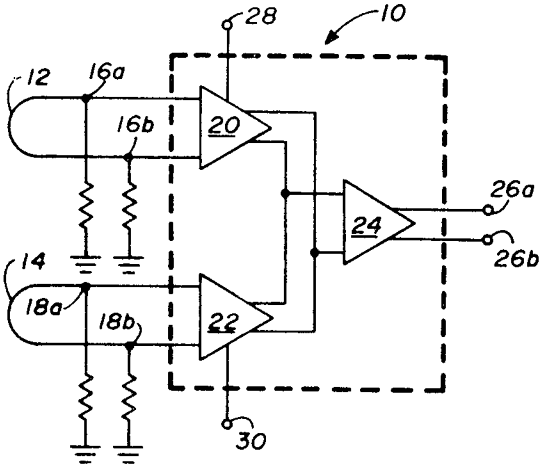
FIG. 1 illustrates a block diagram of a typical amplification system for sensing plated wire memories.

Referring to FIG. 1, a block diagram of a typical amplifier system for sensing plated wire memories is designated generally by the numeral 10. This circuit is particularly advantageous for use as a switched preamplifier circuit in combination with a gated buffer amplifier such as disclosed in applicant's copending patent application Ser. No. 882,659, filed Dec. 5, 1969. A pair of plated wire memory sensing wires 12 and 14 are connected to input terminals 16*a–b* and 18*a–b* of respective amplifiers 20 and 22. The input terminals 16*a–b* and 18*a–b* are connected to ground through suitable resistances. The outputs of the amplifiers 20 and 22 are commonly connected and are fed to the input of a differential amplifier 24, which provides an output amplified voltage at terminals **26*a–b*. In order to select between the preamplifiers 20 and 22, select signals are applied to select terminals 28 and 30. A logic one applied to terminal 28 connects the output signals from amplifier 20 into the input of amplifier 24. A logic one applied to the terminal 30 feeds the output from amplifier 22 through the amplifier 24**.

Figure 2:
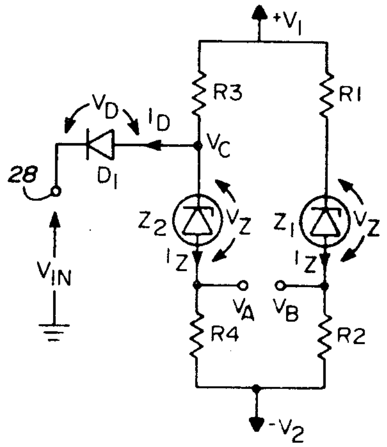
FIG. 2 illustrates a circuit embodying the logic select aspect of the invention.
Figure 4:
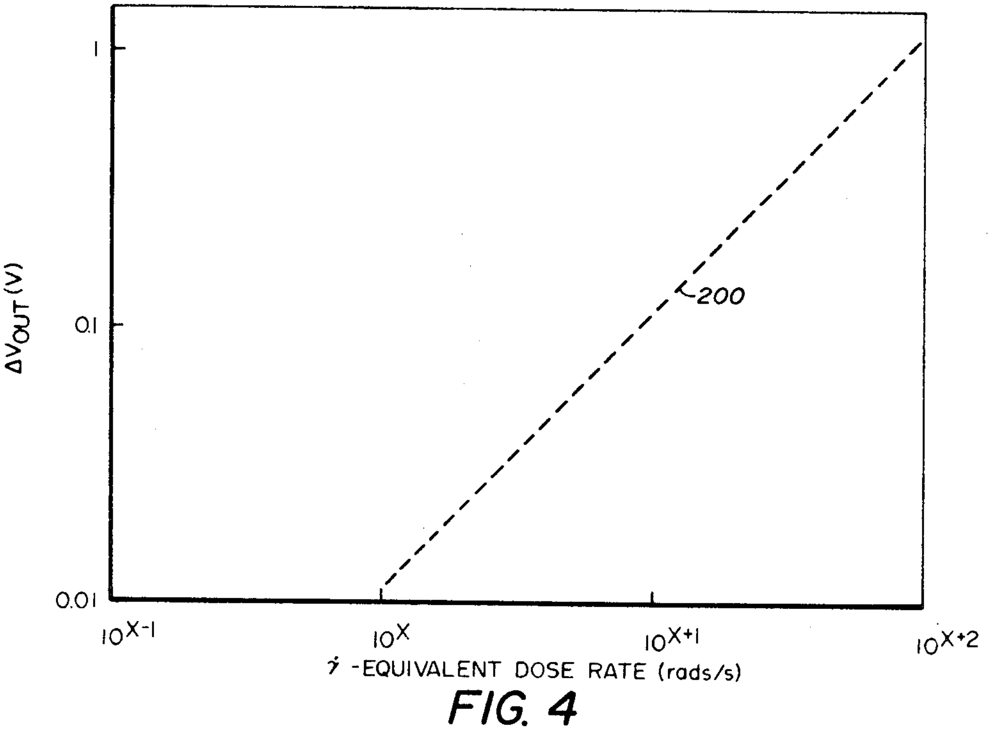
FIG. 4 is a graph illustrating the change in output voltage of the circuit shown in FIG. 3 with increase of radiation dose rate.

For a detailed understanding of the present select circuit invention, reference is made to FIG. 2, wherein a single select circuit for use with amplifier 20 is illustrated. It will be understood that the select circuit for receiving logic signals at select terminal 30 will be similar in construction to the circuit of FIG. 2. The Zener diode $Z_1$ is tied at its cathode through a resistor R1 to a source of positive bias voltage. The voltage appearing at terminal $V_B$ is a control voltage to provide a no-select function. A resistor R2 is connected between the anode of diode $Z_1$ and a source of negative bias voltage. Similarly, the Zener diode $Z_2$ is connected to the positive voltage through resistor R3 and to the negative voltage through resistor R4. The voltage appearing at terminal $V_A$ is the control voltage applied to select the operation of the desired amplifier. Diode $D_1$ is connected between the cathode of diode $Z_2$ and select terminal 28, with voltage $V_{IN}$ being representative of the logic select voltage applied at terminal 28.

An advantage of a select circuit as shown in FIG. 2 is that the selection does not depend upon the absolute values of the various resistors used in the circuit, or upon the value of the particular Zener diode utilized. Rather, the selection depends upon ratios of the Zener voltages and the ratios of any resistors utilized, which may be quite precisely controlled with integrated circuit techniques. This circuit is also relatively insensitive to varying power supplies or temperature changes.

In FIG. 2, it is assumed that the Zener voltages $V_Z$ across each of the diodes $Z_1$ and $Z_2$ are approximately equal to one another. With conventional integrated circuit techniques, diodes $Z_1$ and $Z_2$ may be constructed side by side on the same substrate, and thus may be provided with Zener voltages equal to one another plus or minus about (3). Referring to FIG. 2, when no high input select signal is present, it is desired that $V_B > V_A$ or $V_B - V_A$ is positive, and:

$$V_A = V_{IN} + V_D - V_Z \quad (1)$$

$$V_B = V_1 - I_Z R1 - V_Z \quad (2)$$

$$I_Z = [V_I - (-V_2) - V_Z]/(R1 + R2) \quad (3)$$

Thus $$V_B = V_1 - (R1)/(R1 + R2)\,(V_1 + V_2 - V_Z) - V_Z \quad (4)$$

When a selected preamplifier channel is turned "on" by a high $V_{IN}$, it is desired that $V_A > V_B$ or $V_A - V_B$ is positive, and:

$$V_A = V_1 - I_Z R3 - V_Z \quad (5)$$

$$I_Z = (V_1 + V_2 - V_Z)/(R3 + R4) \quad (6)$$

$$V_A = V_1 - (R3)/(R3 + R4)\,(V_1 + V_2 - V_Z) - V_Z \quad (7)$$

Equations (4) and (7) thus illustrate how the operation of the present circuit is dependent upon the generally equal Zener voltages $V_Z$ and upon resistor ratios rather than resistor absolute values.

In operation of the circuit, if the diodes $Z_1$ and $Z_2$ are properly matched with respect to Zener voltage as described and the input applied at terminal 28 is near ground or zero voltage, diode $D_1$ conducts and pulls the cathode of Zener diode $Z_2$ below the voltage appearing on terminal $V_B$. Thus, the voltage appearing at terminal $V_A$ is insufficient to turn on the first differential amplifier stage 20. However, the voltage appearing at terminal $V_B$ is sufficiently high to insure that both of the stages of differential amplifiers are held off.

If sufficiently high positive voltage is applied at terminal 28, the voltage appearing at terminal $V_A$ is sufficiently above the voltage appearing at $V_B$ so that the voltage appearing at $V_A$ turns on the selected differential amplifier channel 20. As shown by the equations, the value of resistors *R*1 and *R*2, in addition to the Zener voltage of the Zener diode $Z_1$, determine the voltage appearing at terminal $V_B$. Likewise, the ratio of the resistors *R*3 and *R*4, in combination with the Zener voltage of the Zener diode Z2, determines whether or not the diode $D_1$ is back biased for control of the operation of the circuitry.

Another important aspect of the invention is the use of radiation compensating transistors throughout the present circuit to reduce the effect of a radiation field upon the operation of the circuit, the transistors also being used as active stages. It is well known that reverse biased semiconductor junctions generate additional leakage current when hit by radiation, and in particular, gamma radiation. This is because the gamma radiation knocks out hole-electron pairs which act like current flow across the junction. Thus, when a conventional transistor circuit is placed within the radiation field, the circuit acts as if constant current sources have been connected across each of the collector-base junctions of each of the transistors. In amplification circuits, transistors may thus be saturated by ambient radiation fields, and amplification may no longer take place within the circuit.

Figure 3:
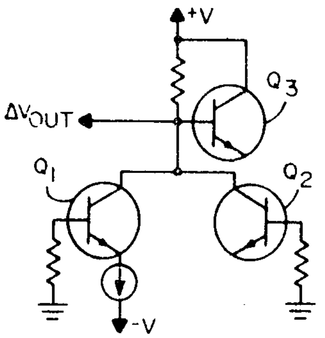
FIG. 3 is a circuit illustrating the radiation compensation technique of the invention.

An example of this aspect of the invention is shown in FIG. 3, wherein a pair of transistors $Q_1$ and $Q_2$ are commonly connected at the collectors thereof. The bases of the transistors $Q_1$ and $Q_2$ are grounded through equal resistances, with a constant current source being connected to the emitter of transistor $Q_1$. A transistor $Q_3$ is connected in an emitter follower configuration to the collectors of transistors $Q_1$ and $Q_2$. Transistor $Q_3$ provides both active output functions and radiation compensating functions, as will be later described.

An important aspect of the invention is that the transistor $Q_3$ is provided with a photocurrent collection volume substantially equal to the sum of the photocurrent collection volumes of the transistors $Q_1$ and $Q_2$. Thus, the transistor $Q_3$ may supply each of the transistors $Q_1$ and $Q_2$ simultaneously with compensation current in response to a radiation field. Photocurrent collection volume is a term known in the integrated circuit art which may be defined as a function of the area of the transistor base, the depth of the collector-base junction, the diffusion length of the minority carriers in the collector, and the width of the collector-base depletion region. The photocurrent collection volume of a transistor determines the amount of photocurrent generated thereby. Basically, the photocurrent generated by a transistor in a radiation field may be generally defined as the photocurrent collection volume multiplied by a constant and by the gamma rate. Of course, if it was desired to radiation-compensate only a single transistor by transistor $Q_3$, the photocurrent collection volumes of the two transistors would be made equal.

For test purposes, the circuit shown in FIG. 3 was subjected to a laser beam for simulation of a radiation field. The resulting variation in the output voltage of the test circuit is illustrated by curve 200. Essentially no increase in the output voltage of the circuits was noticed until the equivalent dose rate of $10^x$ was reached, at which time the output voltage climbed slowly to 1 volt. Such output characteristics are vastly improved over conventional noncompensated amplification circuitry when subjected to a radiation field. Without the use of the present radiation compensation circuitry, the output of the circuit would be up to five times the amount illustrated with the equivalent dose rate of radiation imposed thereon.

Figure 5:
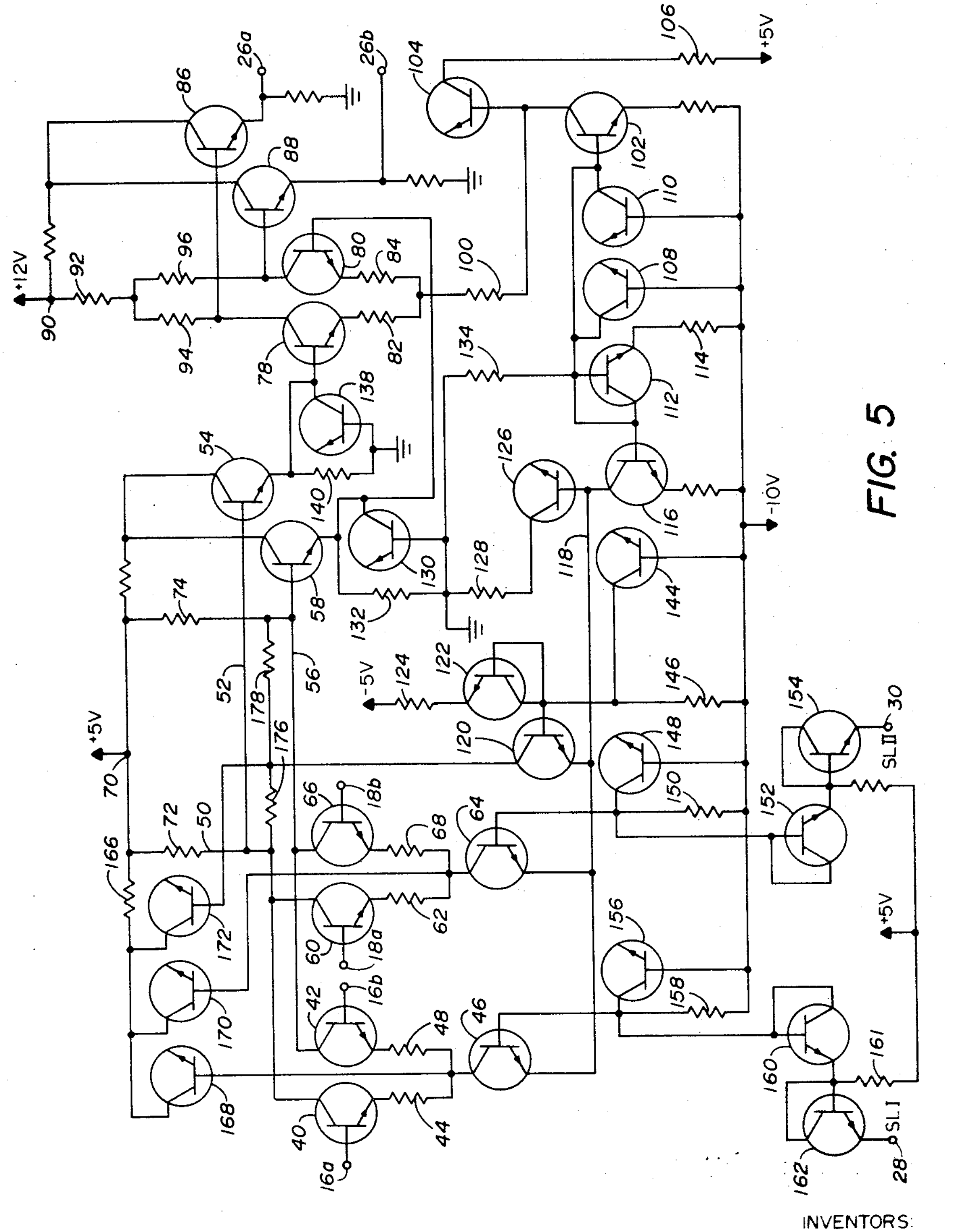
FIG. 5 illustrates a schematic diagram of a circuit embodying each of the inventions shown in FIGS. 2 and 3.

FIG. 5 illustrates a circuit embodying both of the inventions shown in FIGS. 2 and 3 in schematic detail. Input terminal 16a is connected to the base of a transistor 40, while the input terminal 16*b* is likewise connected to the base of a transistor 42. The emitter of transistor 40 is connected through a resistance 44 to the collector of transistor 46. The emitter of transistor 42 is coupled through a resistor 48 also to the collector of transistor 46. Transistors 40 and 42 may thus be seen to be connected in a conventional differential configuration to form the preamplifier stage 20 shown in FIG. 1. The collector of transistor 40 is fed via leads 50 and 52 to the base of a transistor 54 connected in an emitter follower configuration. The collector of transistor 42 is connected via lead 56 to the base of a transistor 58 connected in an emitter follower configuration.

Input 18*a* is fed to the base of a transistor 60, the emitter of which is coupled through a resistor 62 to the collector of a transistor 64. Input terminal 18*b* is connected to the base of a transistor 66 which is coupled through a resistor 68 to the collector of transistor 64. Transistors 60 and 66 are thus connected in a differential configuration to form the second preamplifier stage 22 shown in FIG. 1.

The collector of transistor 60 is commonly tied with the collector of transistor 40, and is connected via leads 50 and 52 to the base of the emitter follower transistor 54. Similarly, the collector of transistor 66 is commonly tied to the collector of transistor 42, and is fed via lead 56 to the base of the emitter follower transistor 58. Suitable positive bias voltage is applied at terminal 70 for application to transistors 40 and 60 across resistor 72. Voltage is applied across resistor 74 to transistors 42 and 66.

Transistors 54, 40 and 60 may be seen to comprise a radiation compensated circuit similar to that shown in FIG. 3, with transistor 54 serving both as an active output stage and as a radiation compensator for transistors 40 and 60. Of course, transistor 54 will be constructed to have a photocurrent collection volume equal to the sum of the collection volumes of transistors 40 and 60. Likewise, transistors 58, 42 and 66 form a second circuit similar to FIG. 3.

The emitter of transistor 54 is directly connected to the base of transistor 78. Similarly, the emitter of transistor 58 is coupled directly to the base of a transistor 80. The emitters of transistors 78 and 80 are connected to suitable resistances 82 and 84 in a differential configuration. The collector of transistor 78 is fed to the base of the transistor 86 connected in an emitter follower configuration. The emitter of transistor 86 is connected to the output terminal 26*a*. The collector of transistor 80 is connected to the base of transistor 88 connected in an emitter follower configuration, the emitter of which is connected to the output terminal 26*b*. Bias voltage is applied at terminal 90 and through bias resistors 92, 94 and 96 to the third amplifier stage comprising the transistors 78 and 80.

The commonly connected terminals of resistors 82 and 84 are connected through a resistance 100 to the collector of a transistor 102. The collector of transistor 102 is connected to the base of transistor 104, the collector of which is connected through a resistance 106 to a source of positive bias voltage. The emitter of transistor 104 is left unconnected so the transistor 104 acts as a diode. The base of transistor 102 is connected to the collectors of a pair of transistors 108 and 110, the bases of which are connected to a source of negative bias voltage. The emitters of transistors 108 and 110 are left unconnected to act as diodes. The base of transistor 102 is also connected to the base of transistor 112, the emitter of which is connected through a resistance 114 to the source of negative bias voltage. The collector and base of transistor 112 are tied together such that the transistor acts as a diode.

The collector of transistor 112 is connected to the base of a transistor 116, the collector of which is connected via lead 118 to the emitters of transistors 46 and 64. Additionally, the collector of transistor 116 is connected via lead 118 to the emitter of transistor 120. The base of transistor 120 is connected to the commonly tied base and collector of a transistor 122. The emitter of transistor 122 is connected through a resistance 124 to a source of positive bias voltage. The collector of transistor 116 is also applied to the base of a transistor 126 connected in a diode configuration.

The collector of transistor 126 is fed through a resistance 128 to the base of a transistor 130 connected in a diode configuration to the emitter of transistor 58. A resistance 132 is connected between the emitter of transistor 58 and one terminal of resistance 128 which is also tied to ground. The base of transistor 130 is also connected through a resistance 134 to the base of transistor 112. The emitter of transistor 54 is connected to the collector of the transistor 138 connected in a diode configuration to circuit ground. A resistance 140 is connected between the collector of transistor 138 and ground.

The collector of transistor 122 is connected to the collector of transistor 144, the base of which is connected to the source of negative voltage potential. The emitter of transistor 144 is left unconnected to serve as a diode. A resistance 146 shunts the collector and base of the transistor 144. The base of transistor 64 is connected to the collector of a transistor 148, the base of which is connected to the source of negative voltage potential. The emitter of transistor 148 is also unconnected so that the transistor serves as a diode. A resistance 150 shunts the collector and base of the transistor 148. The collector of transistor 148 is connected to the commonly tied base and collector of a transistor 152 which serves as a Zener diode. The emitter of transistor 152 is connected to the commonly tied base and emitter of a transistor 154 which also serves as a diode. The emitter of the transistor 154 is connected to the second select terminal 30.

The base of transistor 46 is tied to the collector of the transistor 156, the base of which is connected to the source of negative voltage potential. Resistance 158 is tied across the collector and base of the transistor 156. The collector of transistor 156 is connected to the commonly tied base and collector of a transistor 160 which serves as a Zener diode. The emitter of a transistor 160 is connected to positive bias voltage through resistor 161 and to the commonly tied base and collector of transistor 162, the emitter of which is connected to the first select signal terminal 28. A resistance 166 is connected between the positive voltage terminal 70 and the collectors of transistors 168, 170 and 172. The emitters of transistors 168, 170 and 172 are unconnected so that the transistors act like diodes. The base of transistor 168 is connected to the collector of transistor 46. The base of transistor 170 is connected to the collector of transistor 64. The base of transistor 172 is connected to the collector of transistor 120. Resistors 176 and 178 are also tied to the collector of the transistor 120.

It will be seen that transistor 122 is analogous to Zener diode $Z_1$ shown in FIG. 2, with either transistor 152 or 160 being analogous to the Zener diode $Z_2$ shown therein. The logic select circuit thus shown operates in a similar manner as the circuit shown in FIG. 2. Of course, transistors 122, 152 and 160 are constructed to have generally equal Zener voltage characteristics.

In operation of the circuit shown in FIG. 5, input signals are applied at terminals **16*a–b* and are fed to the differentially connected transistors 40 and 42. When a suitable select signal is applied to terminal 28 for selection of the first differential amplifier stage, transistor 46 is turned on such that amplifiers 40 and 42 receive bias current. The output from transistor 40 is fed through leads 50 and 52 to the base of the emitter follower transistor 54. The output from transistor 42 is fed via lead 56 to the base of the emitter follower transistor 58. The differential signals are then fed into the bases of transistors 78 and 80. The amplified signals from the transistors 78 and 80 are fed through the emitter follower transistors 86 and 88 to the output terminals 26*a–b***.

Likewise, when select signals are applied at terminal 30 for selection of the second preamplifier stage, the transistor 64 is turned on to supply the differentially connected amplifier transistors 60 and 62 with bias current. Thus, when input signals are applied at terminals **18*a–b*, amplified signals are applied to the bases of the emitter follower transistors 54 and 58. The outputs from transistors 54 and 58 are fed into the bases of the differentially connected amplifier transistors 78 and 80. The output of transistors 78 and 80 are fed through the emitter follower transistors 86 and 88 to the output terminals 26*a–b***.

Another important aspect of the circuit is the provision of a generally constant current source for each of the three amplifier stages. A constant current supply for the first and second amplifier stages comprising transistors 40, 42 and 60 and 66 is supplied by the transistor 116 in combination with the diode connected transistor 112. Generally constant current sources are supplied for the differential stage comprising transistors 78 and 80 by the transistor 102 and the diode connected transistor 112.

Compensating photocurrent diode generators are connected in series with the active amplifying transistors utilized within the circuit. For instance, the diode connected transistor 168 is connected to the collector of transistor 46 to eliminate the effects of a radiation field thereon. Diode connected transistor 170 is connected to the collector of transistor 64, while diode connected transistor 172 is connected to the collector of transistor 120. Similar compensating effects are provided by the diode connected transistors found throughout the present circuit.

Figures 6, 7, 8:
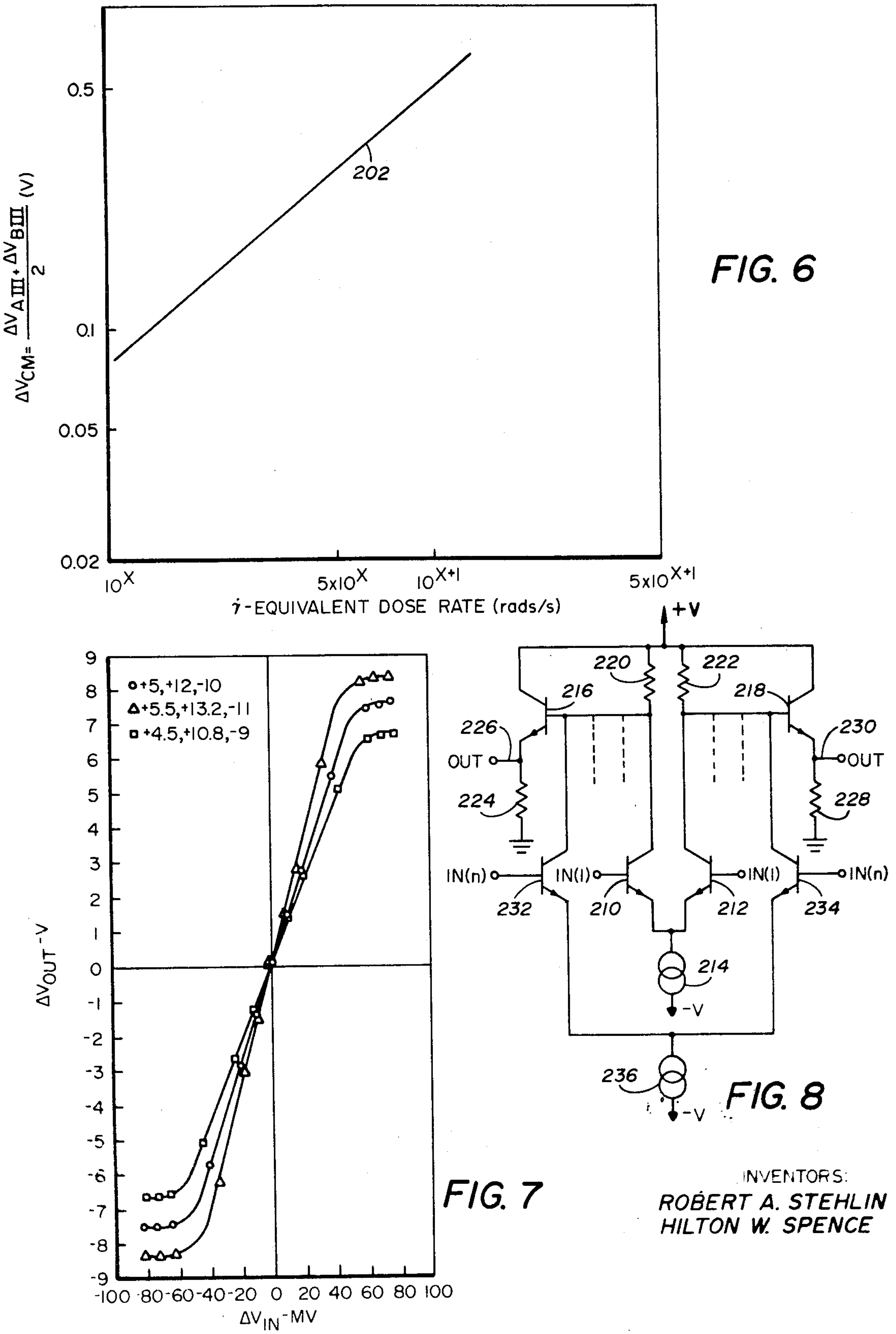
FIG. 6 is a graph illustrating variation of the output voltage of the circuit shown in FIG. 5 with variations in the radiation dose rate.
FIG. 7 is a graph illustrating the transfer characteristics of the circuit shown in FIG. 5.
FIG. 8 is a schematic diagram of another embodiment utilizing the invention.

FIG. 6 illustrates the change in common mode voltage of the output voltage appearing at terminals **26*a–b* of the circuit shown in FIG. 5, upon gamma radiation. It will be seen from the graph that the radiation compensation provided by the various diodes and transistors distributed throughout the circuit maintain excellent linearity of operation of the circuit, even in the presence of relatively high radiation fields. The curve 202** illustrating the change in output common mode voltage of the circuit shows that the change in output voltage is less than half of a volt in the presence of high radiation fields. This compares very favorably with amplifier circuits which are not compensated according to the invention.

FIG. 7 illustrates the transfer characteristics of the entire circuit shown in FIG. 5 with the application of various bias voltages. It will be seen that the present circuit thus provides extremely linear operation over a wide range of input voltages. The present circuit is relatively insensitive to slight variations in the bias voltage magnitudes. Essentially linear operation of the circuit is provided from −40 millivolts to +40 millivolts.

FIG. 8 illustrates a variation of the circuits previously described in FIGS. 3 and 5. FIG. 8 shows a first differential amplifier comprising a transistor 210 having its emitter commonly connected to the emitter of a transistor 212. The emitters of transistors 210 and 212 are connected to a radiation compensated constant current source 214 similar to the sources previously described. A source of negative voltage potential is applied to the constant current source 214. The collector of transistor 210 is directly connected to the base of a transistor 216, while the collector of transistor 212 is directly connected to a base of a transistor 218. The collectors of transistors 216 and 218 are commonly connected. The collector of transistor 210 is connected to the collector of transistor 216 through a resistance 220. Similarly, the collector of transistor 212 is connected to the collector of transistor 218 through a resistance 222. The emitter of transistor 216 is connected to ground through a resistance 224 and is also connected to an output terminal 226. The emitter of transistor 218 is connected to ground through a resistance 228 and also to an output terminal 230.

A second differential amplifier is also connected across the bases of transistors 216 and 218 and comprises a transistor 232 having its collector connected to the base of transistor 216. The base of transistor 232 is connected to receive an input voltage designated as IN($n$) to denote that more than two differential amplifiers could be connected across transistors 216 and 218. The emitter of transistor 232 is connected to the emitter of transistor 234. The collector of transistor 234 is connected to the base of transistor 218. The base of transistor 234 is connected to receive an input labeled IN($n$) to complete the nth differential amplifier stage. A radiation compensated constant current source 236 is connected to the emitters of transistors 232 and 234, and a supply of negative voltage is applied thereto. As indicated by the dotted lines in FIG. 8, additional differential amplifier stages could be added across the bases of transistors 216 and 218, if desired.

Transistors 216 and 218 operate in the manner previously described to supply each of the transistors connected thereto with compensation current in response to a radiation field. As previously described, the photocurrent collection volume of each of the transistors 216 and 218 is substantially equal to the sum of the photocurrent collection volumes of the transistors attached thereto. The transistors 216 and 218 also provide the additional advantage of being active emitter follower devices, in addition to providing the radiation compensation functions.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An amplifier system comprising:

first and second differential amplifiers each connected to receive different low level input signals, each of said amplifiers including transistor pairs receiving said input signals at the bases thereof and coupled together at the emitters in a differential configuration, a third differential amplifier having inputs connected to receive the outputs of each of said first and second amplifiers, electronic switching means coupled between the emitter of each of said first and second amplifiers and a power source for selectively coupling them to said third differential amplifier, and said electronic switching means comprising a plurality of diode means connected in parallel and poled in the same direction across a voltage supply, the breakdown voltages of said diode means being approximately equal and said diode means being selectively operable in response to logic input signals such that either of said first or second amplifiers may be actuated to exclusively feed signals into said third amplifier.

2. An amplifier system comprising:

first and second differential amplifiers each connected to receive different low level input signals, each of said amplifiers including transistor pairs receiving said input signals at the base thereof and coupled together at the emitters in a differential configuration, a third differential amplifier having inputs connected to receive the outputs of each of said first and second amplifiers, electronic switching devices coupled between the emitters of each of said first and second amplifiers and a power source, and diode means for selectively operating said switching devices in accordance with logic input signals such that either of said first or second amplifiers may be actuated to exclusively feed signals into said third amplifier, the breakdown voltages of each of said diode means being generally equal, and wherein said diode means comprises a first Zener diode connected through resistances to bias voltage, the voltage at the anode thereof maintaining each of said first and second amplifiers off when no logic input is received, and a second Zener diode connected to each of said electronic switching devices and each Zener diode operable in response to a high logic voltage at the cathode thereof to turn the respective amplifier stage on.

3. An amplifier comprising:

first and second differential amplifiers each connected to receive different low level input signals, each of said amplifiers including transistor pairs receiving said input signals at the bases thereof and coupled together at the emitters in a differential configuration, a third differential amplifier having inputs connected to receive the outputs of each of said first and second amplifiers, electronic switching devices coupled between the emitters of each of said first and second amplifiers and a power source, means for selectively operating said switching devices in accordance with logic input signals such that either of said first or second amplifiers may be actuated to exclusively feed signals into said third amplifier, and radiation compensation means comprising a transistor connected in an emitter follower configuration having its base electrode connected to the output of one transistor in said first differential amplifier and one transistor in said second differential amplifier, said transistor being in an emitter follower configuration and having its photocurrent collection volume approximately equal to the sum of the photocurrent collection volume of said one transistor in said first differential amplifier and said one transistor in said second differential amplifier.

4. In an amplifier system requiring switching of plural stages, the combination comprising:

a first electronic switching device having Zener voltage breakdown characteristics and connected to a source of bias voltage through a resistance, one terminal of said first switching device connected to normally switch said stages out of said system;

a second electronic switching device having Zener voltage breakdown characteristics approximately equal to the characteristics of said first device and connected through a resistance to said source of bias voltage, one terminal of said second switching device connected for selectively switching one of said stages into or out of said system, and unidirectional conducting means connected to the other terminal of said second switching device for receiving input logic signals which selectively control the state of said second switching device.

5. The combination of claim 4 wherein said switching devices having Zener voltage breakdown characteristics comprise transistors having the bases and collectors commonly tied, and wherein the emitter-base breakdown characteristics of said transistors are generally equal.

6. The combination of claim 4 wherein said unidirectional conducting means comprises a transistor having the collector and base commonly connected with the emitter thereof and connected to receive the input logic signals.

7. The combination of claim 4 and further comprising:

a third electronic switching device having Zener voltage breakdown characteristics and connected through a resistance to said source of bias voltage, one terminal of said third switching device connected for selectively switching another of said stages into or out of said system, and diode means connected to the other terminal of said third switching means for receiving logic signals which control the state of said third switching device.

8. The combination of claim 7 and further comprising:

means connected to each of said switching devices for generating compensating current in response to the presence of radiation.

9. A radiation compensated amplification system comprising:

a transistor amplification stage, and an active output stage connected to said amplification stage and including a transistor connected in an emitter follower configuration having its base electrode connected to the output of said amplification stage, said transistor having an emitter follower configuration having a photocurrent collection volume approximately equal to the photocurrent collection volume of the transistor in said amplification stage.

10. A differential amplifier circuit having radiation compensation comprising:

a plurality of amplifying transistors connected to form a plurality of differential amplifiers, and at least two output transistors each connected in an emitter follower configuration and having their base electrodes connected to the output electrodes of a portion of said amplifying transistors, each said output transistor having a photocurrent collection volume generally equal to the sum of the photocurrent collection volumes of the amplifying transistors connected thereto.

11. An amplifier system comprising:

a differential amplifier having a plurality of transistors adapted to receive input signals at the base thereof and coupled together at the emitters in a differential configuration, electronic switching means coupled to said emitters of said transistors for selectively energizing said differential amplifier, said electronic switching means comprising a first device having Zener voltage breakdown characteristics connected to a source of bias voltage through a resistance, one terminal of said first device connected to normally disable said differential amplifier, a second device having Zener voltage breakdown characteristics approximately equal to said characteristics of said first device connected through a resistance to said source of bias voltage, one terminal of said second device connected for selectively enabling said differential amplifier, and uni-directional conducting means connected to the other terminal of said second device for receiving input logic signals which selectively control the state of said second device.

12. The combination of claim 11 wherein said switching devices having Zener voltage breakdown characteristics comprise transistors having the bases and collectors commonly tied, and wherein the emitter-base breakdown characteristics of said transistors are generally equal.

13. The combination of claim 11 wherein said unidirectional conducting means comprises a transistor having the collector and base commonly conducted with the emitter thereof and connected to receive the input logic signals.

14. The combination of claim 11 and further comprising:

a third electronic switching device having Zener voltage breakdown characteristics and connected through a resistance to said source of bias voltage, one terminal of said third switching device connected for selectively switching another of said stages into or out of said system, and diode means connected to the other terminal of said third switching means for receiving logic signals which control the state of said third switching device.

15. The combination of claim 11 and further comprising:

means connected to each of said switching devices for generating compensating current in response to the presence of radiation.

16. Radiation compensation amplification system comprising:

a plurality of amplifying transistors, an output transistor connected in an emitter follower configuration, the collectors of said amplifying transistors being connected to the base of said output transistor, and the photocurrent collection volume of said output transistor being approximately equal to the sum of the photocurrent collection volumes of said plurality of amplifying transistors.

* * * * *